Figure 1:
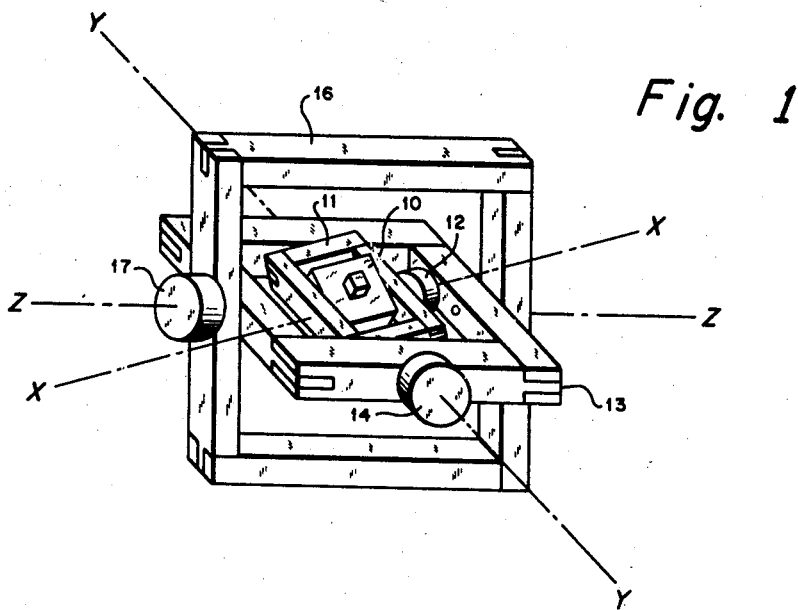

Sept. 15, 1964  J. H. GREGOWSKI  3,149,280
MAGNETOMETER SUPPORTING GIMBAL SYSTEM HAVING
SEGMENTED FRAME MEMBERS WITH RELATIVELY
HIGH IMPEDANCE BONDING THEREBETWEEN
Filed Oct. 19, 1960

INVENTOR.
JOEL H. GREGOWSKI

BY

ATTORNEY 3,149,280
MAGNETOMETER SUPPORTING GIMBAL SYSTEM HAVING SEGMENTED FRAME MEMBERS WITH RELATIVELY HIGH IMPEDANCE BONDING THEREBETWEEN
Joel H. Gregowski, Mountain View, Calif., assignor, by mesne assignments, to the United States of America as represented by the Secretary of the Navy
Filed Oct. 19, 1960, Ser. No. 63,705
1 Claim. (Cl. 324—43)

The present invention relates to article supporting structure and more particularly to a magnetically inert gimbal for position-stabilizing a sensitive ambient magnetic field detector.

Magnetic detecting systems using extremely sensitive magnetometers have been adapted for use by low flying aircraft to detect and locate a submerged submarine or similar objects by measuring the ambient magnetic anomalies or irregular deviations caused by the presence of the submarine or object in the same magnetic field of the earth as that of the detector. A position-stabilized gimbal system is required to maintain the detector oriented relative to the magnetic field of the earth irrespective of aircraft motions such as roll, yaw and pitch. This is necessary to preclude indistinguishable magnetic signals which would otherwise result as the detector rotated with respect to the earth's magnetic field. The gimbal system must also be of a magnetically inert character so that its presence about the detector will not introduce other extrinsic magnetic field signals indistinguishable from anomalous signals caused by the submarine or object. Such other extrinsic magnetic signals can be created by eddy currents induced in the gimbals as they traverse through the earth's magnetic field. The extrinsic magnetic fields created thereby in close proximity to the detector degrade the intelligence of the anomalous magnetic signal produced by the submarine or object.

Accordingly, it is an object of the present invention to provide improved supporting structure for an ambient magnetic field detector which will not introduce extrinsic and indistinguishable magnetic fields at the detector, which is very highly resistive to induced eddy currents, which has uniform strength throughout, which can be formed and machined for the transmission of high pressure hydraulic oil or of electrical conduits, and which can be manufactured in large quantities by relatively simple and inexpensive methods.

It is another object of the present invention to provide an improved gimbal for an ambient magnetic field detector which is substantially magnetically inert and which is adaptable in combination with similar gimbals and position-responsive servo motors for stabilizing the detector in a prescribed orientation relative to the ambient magnetic field of the earth.

Various other objects and advantages will appear in the following description of one embodiment of the invention, and the most novel features will be particularly pointed out hereinafter in connection with the appended claim.

Figure 2:
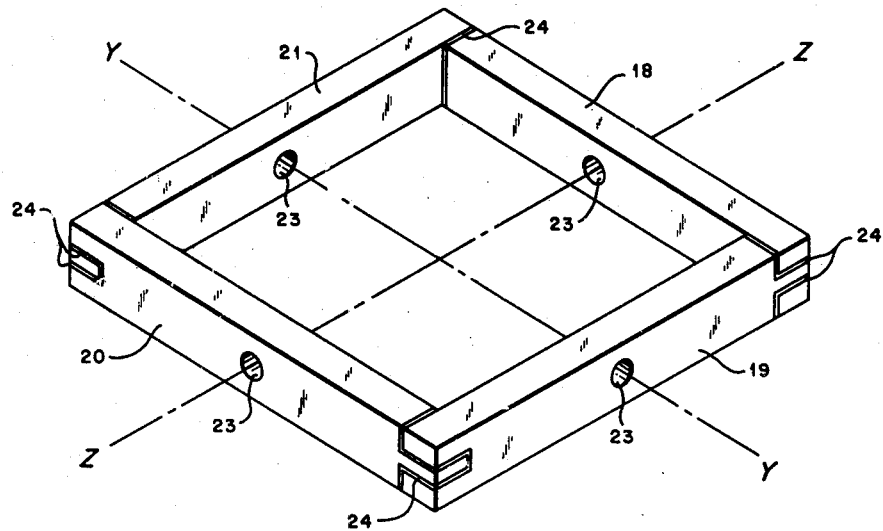

In the accompanying drawings:

FIG. 1 represents an isometric view of several gimbals of the present invention coacting through servo motors to stabilize an ambient magnetic field detector; and FIG. 2 represents a larger isometric view of one of the gimbals illustrated in FIG. 1.

In the illustrated embodiment of the invention, an ambient magnetic field detector 10, such as a saturable core magnetometer, is journaled about an axis X—X of an inner gimbal 11. The detector 10 is rotated about the axis X—X with respect to the inner gimbal 11 by a servo motor 12. The motor 12 must be of the type which does not generate any magnetic field externally of itself. Such a motor is disclosed in application Serial No. 35,853 of Joel H. Gregowski et al. for Electromechanical Device, filed June 13, 1960, now Patent No. 3,063,422.

An intermediate gimbal 13 rotatably supports the inner gimbal 11 about a Y—Y axis, the Y—Y axis lying in the gimbal 13 and being normal to the X—X axis. A servo motor 14, similar to the servo motor 12, causes the gimbal 11 to rotate with respect to the intermediate gimbal 13 about the Y—Y axis.

An outer gimbal 16 is fixed to rigid airplane structure (not shown) and rotatably supports the intermediate gimbal 13 about a Z—Z axis, the Z—Z axis lying in the gimbal 16 and being normal to the Y—Y axis. Rotation of the intermediate gimbal 13 with respect to the frame about the Z—Z axis is effected by the servo motor 17, which is also similar to the servo motor 12.

The operation of the stabilized detector should now be apparent. Signals indicative of deviations from a prescribed orientation relative to the magnetic field of the earth of the ambient magnetic field detector 10 are transmitted to the appropriate servo motors 12, 14 and 17, respectively, whereupon the detector 10, inner gimbal 11 and intermediate gimbal 13 are discretely repositioned to nullify the deviation signals. Complete stabilization can be obtained using only gimbals 11 and 13 and the servo motors 12 and 14; however, the outer gimbal 16 and the servo motor 17 provide a course adjustment of the detector about the Z—Z axis. The Z—Z axis is therefore preferably aligned with the axis of the aircraft about which the greatest amount of deviations are experienced; for example, the longitudinal axis of the aircraft's fuselage.

The enlarged isometric view of the intermediate gimbal 13 illustrates in more detail the manner of its construction. The gimbals 11 and 16 are similarly constructed. The gimbal 13 is comprised of four separate side segments 18, 19, 20 and 21 which are conveniently drilled therethrough along the Y—Y and Z—Z axes to form journals 23 for the inner gimbal 11 and the outer gimbal 16, respectively. One end of each segment 18, 19, 20 and 21 defines a projecting tongue, and the other end of each segment 18, 19, 20 and 21 forms a groove therein. Each segment 18, 19, 20 and 21 is disposed in a single plane at 90 degrees from two adjacent segments and has its tongue end inserted within the groove end of one adjacent segment and its groove end receiving the tongue end of the other adjacent segment. The segments thus tongue-and-groove joined together form a rectilinear configuration. The tongues are smaller in dimension than the grooves so as to leave spacings between adjacent segments. The adjacent segments are maintained separated from each other at their tongue-and-groove joints by an epoxy cement bond 24 filling the spacings and which secures their confronting surfaces.

The epoxy cement bond 24 has high electrical resistance properties and maintains a strong, contiguous connection between the adjacent segments. It should now be apparent that the epoxy cement bonds 24 impede the induction of eddy currents around the gimbal thereby precluding the generation of indistinguishable and extrinsic magnetic fields which would otherwise be produced by eddy currents.

It is contemplated that the segments 18, 19, 20 and 21 also be composed of an electrically nonconducting material such as Fiberglas or a similar plastic. These materials also lend themselves highly to easy machining and drilling as may be required for producing internal passages (not shown) throughout the gimbals to transmit hydraulic fluids or electrical conduits.

It will be understood, of course, that various changes in details, materials, steps and arrangements of parts, which have been herein described and illustrated in order to explain the nature of the invention, may be made by those skilled in the art within the principle and scope of the invention as expressed in the appended claim.

What is claimed is:

A gimbal system for position-stabilizing a magnetometer detector, comprising:
- a first gimbal formed to journal the detector about a first axis in said first gimbal;
- a second gimbal formed to journal said first gimbal about a second axis in said second gimbal and normal to said first axis;
- and a third gimbal formed to journal said second gimbal about a third axis in said third gimbal;
- said first, second and third gimbals each being composed of four elongated high electrical resistance segments arranged to form a rectilinear enclosed frame having tongue-and-groove connections at the corners, a relatively higher electrical resistance cement bond exclusively juxtaposed and secured between the confronting tongue-and-groove surfaces to maintain a spatial relationship between said segments;
- whereby the induction of eddy currents in said gimbals are substantially impeded and the generation of indistinguishable and extrinsic magnetic fields is precluded.

References Cited in the file of this patent

UNITED STATES PATENTS

| | | |
|---|---|---|
| 262,148 | Stuart | Aug. 1, 1882 |
| 2,744,235 | Breit | May 1, 1956 |
| 2,771,779 | Schaffer et al. | Nov. 27, 1956 |
| 2,779,214 | Murphy | Jan. 29, 1957 |
| 2,879,252 | Been et al. | Mar. 24, 1959 |
| 2,961,877 | Edwards | Nov. 29, 1960 |
| 3,020,329 | Deans | Feb. 6, 1962 |